United States Patent

[11] 3,544,736

[72] Inventor William A. Bruwer, Jr.
Greensboro, North Carolina
[21] Appl. No. 789,444
[22] Filed Jan. 7, 1969
[45] Patented Dec. 1, 1970
[73] Assignee Bell Telephone Laboratories, Incorporated
Murray Hill, New Jersey
a corporation of New York

[54] BROADBAND TRANSMISSION TESTING APPARATUS
7 Claims, 3 Drawing Figs.

[52] U.S. Cl. .......... 179/175.3, 328/181
[51] Int. Cl. .......... H04b 3/46
[50] Field of Search .......... 179/175.3; 328/28, 36

No References Cited

*Primary Examiner*—Kathleen H. Claffy
*Assistant Examiner*—Douglas W. Olms
*Attorneys*—R. J. Guenther and William L. Keefauver

ABSTRACT: Apparatus for suppressing the energy in predetermined bands of the signal frequency spectrum of a sweep frequency generator, used for testing transmission systems, is disclosed. Selective energy suppression is accomplished by adding a staircase waveform to a triangular waveform used to drive a sweep frequency generator. The resulting discontinuities in the composite waveform, which are precisely situated by the use of stabilized oscillators, increase the sweep speed in the selected frequency bands and thereby substantially decrease the energy content of said bands.

INVENTOR
W. A. BRUWER JR.
BY Gerard E. Murphy
ATTORNEY

BROADBAND TRANSMISSION TESTING APPARATUS

BACKGROUND OF THE INVENTION

1. Field of the Invention

This invention pertains to apparatus for measuring the performance of broadband transmission systems having pilot wave controlled equipment and, more particularly, to measuring apparatus in which swept frequency test signals are precluded from impairing the normal operation of pilot wave controlled equipment.

In the art of signal transmission, it is not uncommon to utilize a plurality of repeaters controlled by a group of pilot waves to regulate the performance of a transmission system. Repeaters of this type are activated by frequency selective control equipment responsive to transmitted pilot waves or tones. It is typical when testing transmission systems to apply test signals which are periodically swept over frequency ranges substantially coextensive with the operating frequency range of the system and which thus include components at pilot wave frequencies. It has been found that such test signals, having components lying within the frequency region of pilot tones, impair the normal operation of the pilot wave controlled repeaters.

2. Description of the Prior Art

A system for alleviating this problem is disclosed in U.S. Pat. No. 2,767,260, issued to J.P. Kinzer et al. on Oct. 16, 1956. In the circuit described therein, a series of voltage pulses are developed, each corresponding to a particular pilot wave frequency. The pulses are added to a sawtooth voltage to produce a plurality of discontinuities in the sawtooth waveform. The resulting composite signal is used to control the output of a reactance tube oscillator in such a manner as to sweep the output signal frequency thereof through a plurality of preselected bands (each embracing a pilot wave frequency) at a time rate substantially greater than the normal time rate sweep of the other test signal frequencies. The increase in the time rate sweep of these preselected frequency components reduces the signal energy available to the pilot wave controlled equipment in the same proportion as the rate of sweep is increased.

Though the system described is adequate, it suffers from a number of limitations which it is the object of this invention to overcome. For example, in order to generate a series of voltage pulses, an amplifier, whose plate circuit is tuned by frequency selective networks to be antiresonant at frequencies corresponding to pilot wave tones, is used to initiate the generation of the required pulses. In practice, it has been found that a circuit of this type requires continual readjustment and maintenance to function properly. In addition, the direct addition of pulses to a sawtooth waveform develops discontinuities in the resultant composite waveform which are characterized by "vertical" and "horizontal" transition intervals. The presence of horizontal or "dead space" intervals produces modulation perturbations which deviate from the desired performance of the system.

SUMMARY OF THE INVENTION

In accordance with the principles of this invention, these limitations are overcome by modulating a sweep frequency signal with a plurality of reference signals, having frequencies corresponding to said pilot wave frequencies, to develop "-zero-beat" marker signals whenever the sweep frequency signal coincides with a pilot wave tone. The resulting marker signals are envelope detected, amplified, filtered, clipped and then used to actuate a pulse generator, developing a rectangular pulse signal which, in turn, is differentiated to produce a negative going "spike" signal. An up-down counter responsive to the spike signals develops digital signals representative of the number of spike signals applied to the counter. Digital-to-analog conversion is than performed to develop a "staircase" waveform signal. The staircase waveform signal is combined with a triangular waveform signal to develop a composite control signal which is free from the objectionable perturbation producing discontinuities described above.

These and further features and objects of this invention, its nature and various advantages, will become apparent upon consideration of the attached drawings and of the following detailed description of the drawings.

DETAILED DESCRIPTION

Figure 1:
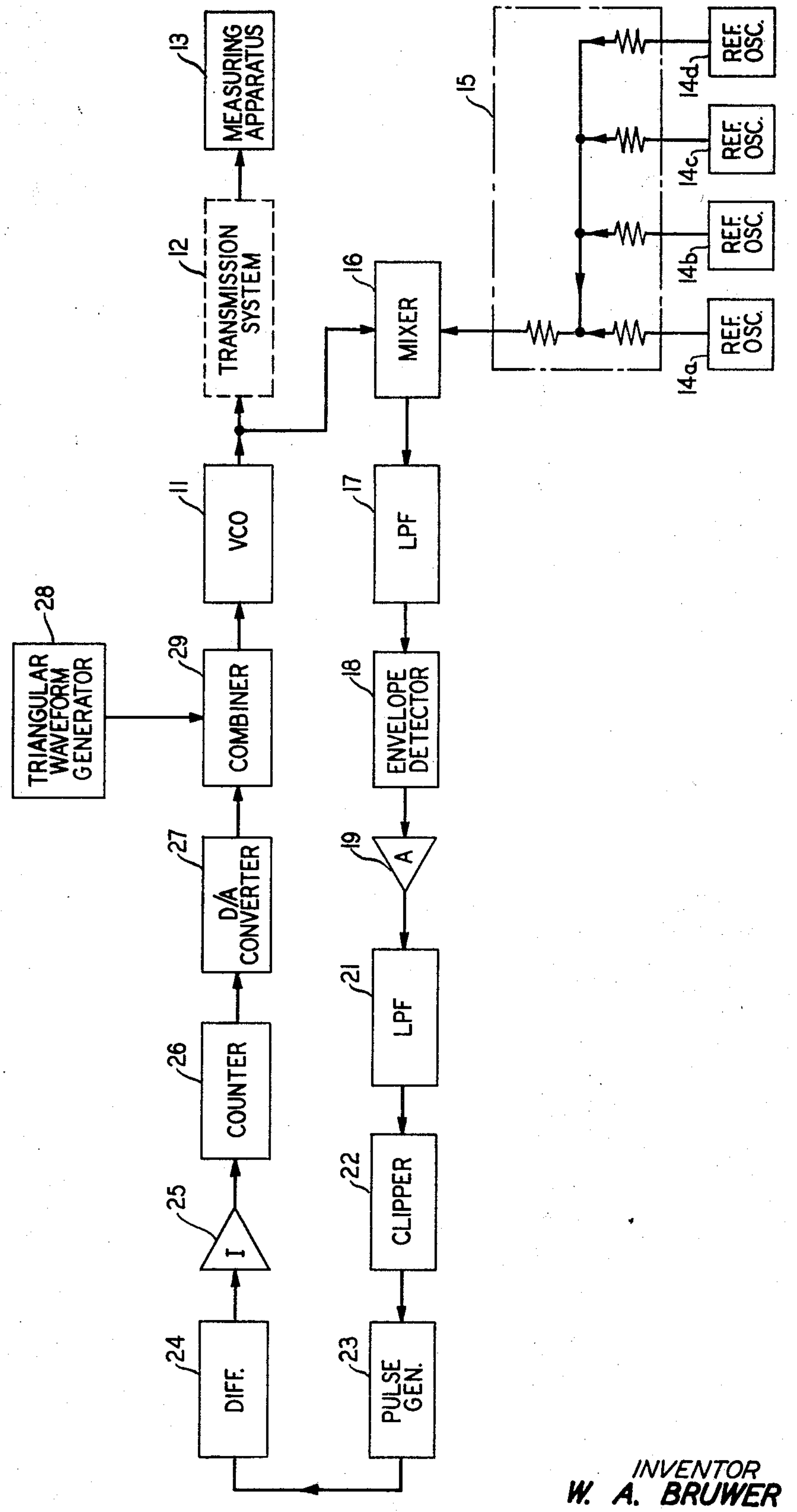
FIG. 1 is a block diagram of an illustrative embodiment of this invention.
Figure 2:
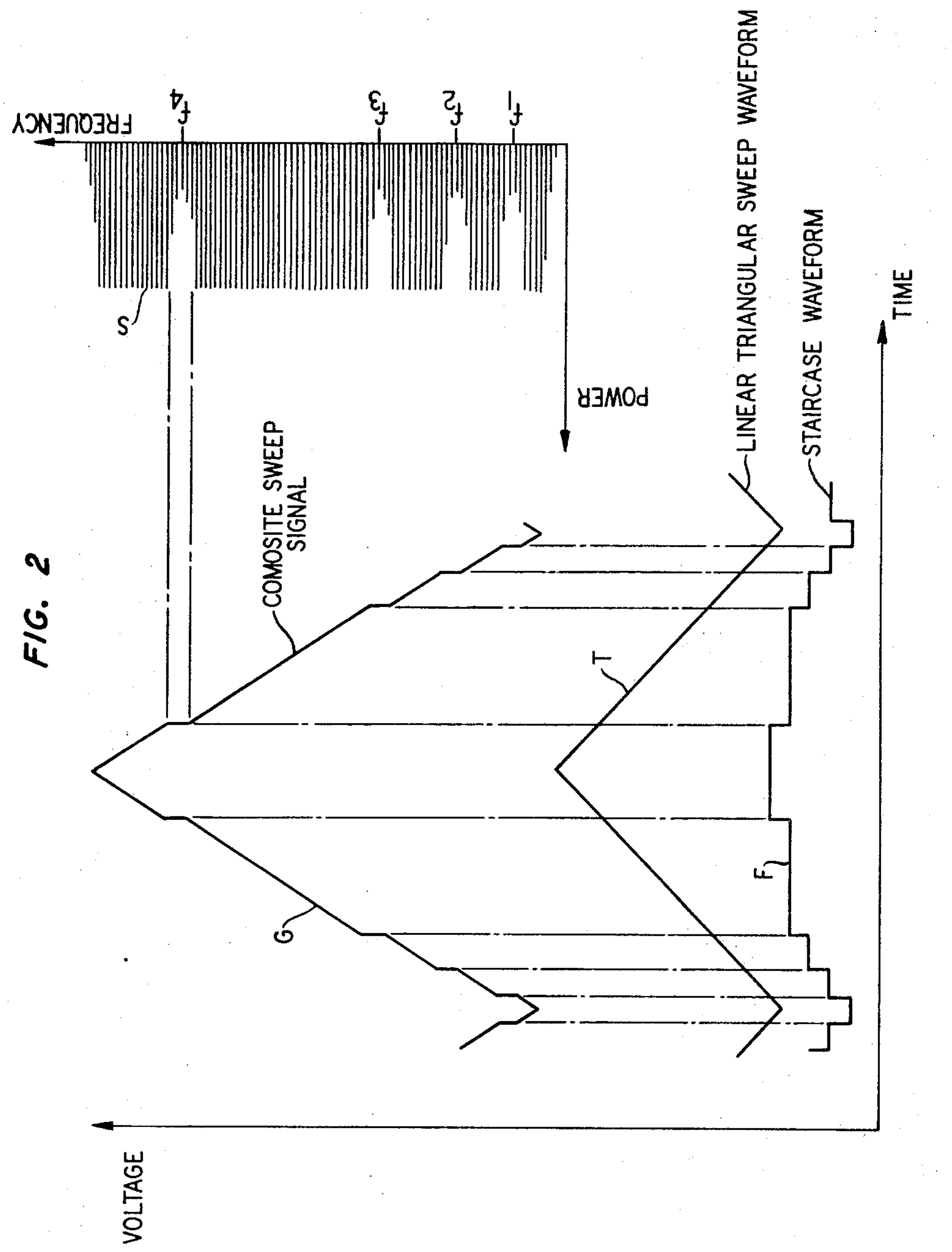
FIG. 2 depicts in graphic form the operation of the invention.

Transmission system 12 in FIG. 1 may be of the type described in aforementioned U.S. Pat. No. 2,767,260 comprising a plurality of repeaters activated by pilot tones of predetermined frequencies, $f_1$, $f_2$...$f_n$. Signals for testing the performance of system 12 are supplied by voltage controlled oscillator (VCO) 11 whose output signal frequency is swept over a preselected operating frequency range, e.g. 0.35 to 8.25 mHz., determined by a triangular waveform signal (waveform T of FIG. 2) furnished by generator 28. The operation of combiner network 29 will be discussed hereinafter. Suitable measuring apparatus 13 for indicating gain, phase distortion or other electrical characteristics terminates transmission system 12. It may be apparent that the application of test signals, which include one or more of the preselected pilot wave frequencies, would activate the repeaters used in system 12 and thereby impair the normal operation of said repeaters.

In accordance with this invention, apparatus is utilized to modify the triangular waveform signal of generator 28 in such a manner that the time rate sweep of test signal frequencies lying within predetermined regions of the pilot wave frequencies are substantially increased relative to the normal time rate seep, e.g. 37.5 Hz., of the remaining test signal frequencies. The rapid transition of these predetermined spectral band substantially reduces the energy content of the signals included within the band and therefore minimizes their effect on the repeaters of system 12. The energy gaps or slots resulting in the signal sweep output of oscillator 11, each embracing a pilot wave frequency $f_1$, $f_2$, etc., is illustrated by the sweep spectral presentation, S, of FIG. 2.

Figure 3:
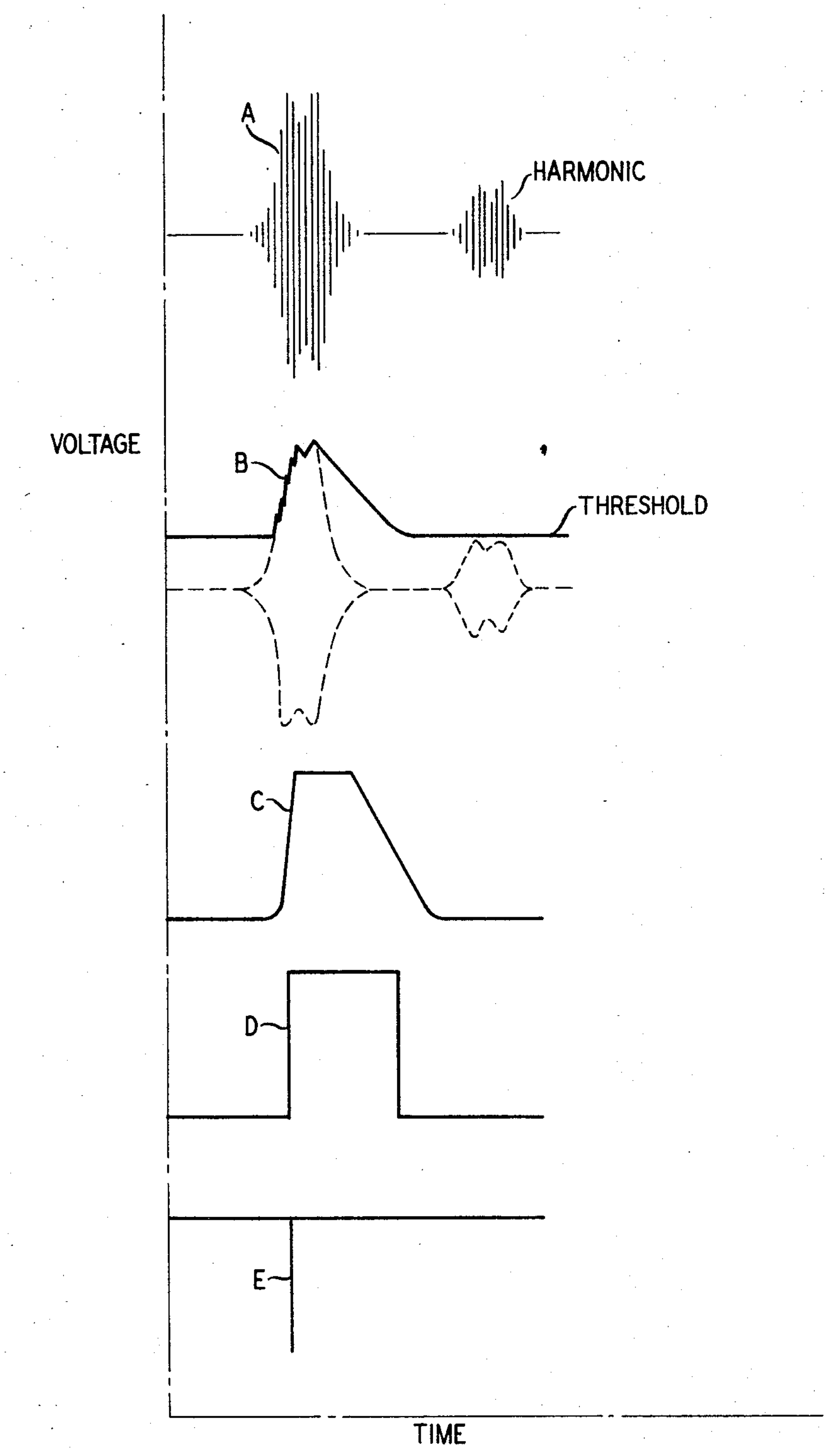
FIG. 3 depicts various signal waveforms generated by the apparatus of this invention.

In order to achieve this desired result without relying on tuned amplifier circuits, the output signal of oscillator 11 is mixed, i.e., modulated, with a plurality of reference signals, having frequencies corresponding to the pilot wave tones, generated by crystal controlled oscillators **14*a*, 14*b*... 14*d*. Of course, the number of oscillators used corresponds on a one-to-one basis with the number of pilot signal frequencies utilized by system 12. Stabilized oscillators, of the type described, require little, if any, maintenance or adjustment. Thus, reference signals emanating from oscillators 14*a*, 14*b*, etc., are combined in resistive summing network 15 and applied to mixer 16. Mixer 16, which may be a product modulator of any well-known type, develops a "zero-beat" signal when the signal frequencies of the sweep signal and the reference signals coincide. Thus, in the present illustrative example, a zero-beat signal (illustrated by waveform A of FIG. 3) will be developed at four pilot wave frequencies $f_1$, $f_2$, $f_3$and $f_4$. The output signals of mixer 16 are applied to lowpass filter 17 which develops a series of marker signals, each of which is a symmetrical reproduction of the lowpass filter characteristic of filter 17 and each of which occurs at a predetermined pilot tone frequency. The cutoff frequency of filter 17 may be approximately 125 kHz. The marker signals are amplified and envelop detected by detector 18; the resulting signal is illustrated by waveform B of FIG. 3. By properly adjusting the threshold level of detector 18, in a well-known manner, extraneous and unwanted harmonic signals are eliminated, as shown by waveform B. The resulting envelope-detected signal is then magnified by amplifier 19, filtered by lowpass filter 21, and processed by clipper 22. The clipped signal, shown as waveform C of FIG. 3, actuates pulse generator 23, which may be of any well-known type, e.g., a Schmitt trigger circuit, to develop a rectangular pulse signal depicted as waveform D of FIG. 3. In a specific embodiment of the invention, the leading edge of the rectangular pulse occurs at a point in time corresponding to approximately 125 kHz. before each pilot tone is reached by the sweep signal. A negative going spike, waveform E of FIG. 3, is generated from the leading edge of the rectangular pulse by differentiator 24 and inverting amplifier 25. Thus, a series of negative going spikes, each corresponding to a pilot wave frequency is generated. The negative going spikes are used to trigger a binary up-down counter 26** arranged to reverse after *n*, e.g., four pulses, i.e., the number of pilot wave tones. Counter 26, which may be of any well-known type, digitally counts up to four as the sweep frequency passes through the four pilot wave frequencies on the up sweep and then counts back down to zero as the sweep passes through the four pilot tones on the down sweep. A digital-to-analog converter 27, which may be of the resistive network type, responds to the energy state of counter 27 by developing a staircase waveform signal, waveform F of FIG. 2, the "steps" of which correspond to the occurrence of pilot wave tones. The staircase waveform signal, developed by converter 27, is added to the triangular waveform signal, developed by generator 28, in combiner, i.e., adder, network 29 to develop a composite control signal, waveform G of FIG. 2, for oscillator 11. It is noted that in waveform G the discontinuities introduced have only vertical transition intervals, i.e., no horizontal step is present; rather, before and after a discontinuity occurs, the wave continues at the same rate of increase. The absence of a dead space or horizontal portion on the composite control signal eliminates unwanted modulation products which occur when pulses instead of a staircase waveform are combined with the sweep waveform.

It is to be understood that the embodiments shown and described herein are illustrative of the principles of this invention only, and that modifications of this invention may be implemented by those skilled in the art without departing from the scope and spirit of the invention; for example, this invention is equally applicable to radio transmission systems and all other transmission systems utilizing pilot wave controlled repeaters.

I claim:

1. In a broadband signal transmission system including automatic signal transmission regulating equipment selectively controlled by pilot waves transmitted through said system and responsive to a swept frequency test signal applied to said system, improved means for suppressing the energy content of said swept signal in predetermined spectral bands embracing the frequencies of said pilot waves comprising:

- stabilized oscillator means for generating a plurality of reference signals having frequencies corresponding, respectively, to the frequencies of said pilot waves;
- means for modulating said reference signals and said swept frequency signal to develop zero-beat signals;
- means for filtering said zero-beat signals;
- means for envelope detecting said filtered signals;
- means responsive to said envelope-detecting means for generating pulse signals;
- means for differentiating said pulse signals to develop spike signals;
- counter means responsive to said spike signals for selectively developing digital signals representative of the number of applies spike signals;
- digital-to-analog converter means responsive to the digital signals developed by said counter means for developing a staircase waveform signal having discontinuities substantially corresponding to the relative location of said pilot wave frequencies;
- means for developing a triangular waveform signal;
- means for combining said staircase waveform signal and said triangular waveform signal to develop a composite waveform signal; and
- voltage controlled oscillator means responsive to said composite signal for generating said swept frequency signal.

2. Apparatus defined in claim 1 wherein said counter means is a binary up-down counter.

3. In a broadband signal transmission system including automatic signal transmission regulating equipment selectively controlled by pilot waves, improved means for suppressing the energy content of an applied signal in predetermined spectral bands embracing the frequencies of said pilot waves comprising:

- sweep oscillator means;
- means for generating a plurality of reference signals having frequencies corresponding, respectively, to the frequencies of said pilot waves;
- means for modulating said reference signals and signals developed by said sweep oscillator means to develop first control signals;
- signal processing means responsive to said first control signals for generating pulse signals;
- counter means responsive to said pulse signals for selectively developing digital signals representative of the number of pulse signals applied thereto;
- digital-to-analog converter means responsive to the digital signals developed by said counter means for developing a staircase waveform signal having discontinuities substantially corresponding to the relative location of said pilot wave frequencies;
- means for developing a triangular waveform signal; and
- means for combining said staircase waveform signal and said triangular waveform signal to develop a composite waveform signal for controlling said sweep oscillator means.

4. Apparatus defined in claim 3 wherein said counter means is binary up-down counter.

5. Signal transmission testing apparatus for suppressing the energy content of an applied sweep frequency signal in predetermined spectral bands comprising:

- oscillator means for generating a sweep frequency signal;
- stabilized oscillator means for generating a plurality of reference signals having predetermined frequencies;
- means for modulating said reference signals and said sweep frequency signal to develop control signals;
- means responsive to said control signals for generating pulse signals;
- counter means responsive to said pulse signals for selectively developing digital signals representative of the number of applied pulse signals;
- means responsive to the digital signals developed by said counter means for developing a staircase waveform signal having discontinuities substantially corresponding to the relative location of said predetermined frequencies;
- means for developing a triangular waveform signal; and
- means for combining said staircase waveform signal and said triangular waveform signal to develop a composite waveform signal for controlling said oscillator means.

6. Apparatus defined in claim 5 wherein said counter means is a binary up-down counter.

7. Signal transmission testing apparatus for suppressing the energy content of an applied sweep frequency signal in predetermined spectral bands comprising:

- oscillator means for generating a sweep frequency signal;
- stabilized oscillator means for generating a plurality of reference signals having predetermined frequencies;
- means for processing said reference signals and said sweep frequency signal to develop control signals;
- counter means responsive to said control signals for selectively developing digital signals;
- digital-to-analog converter means responsive to the digital signals developed by said counter means for developing a staircase waveform signal having discontinuities corresponding to the relative location of said predetermined frequencies;
- means for developing a triangular waveform signal; and
- means for combining said staircase waveform signal and aid triangular waveform signal to develop a composite waveform signal for controlling said oscillator means.